(12) United States Patent
Brown et al.

(10) Patent No.: US 7,839,839 B2
(45) Date of Patent: Nov. 23, 2010

(54) DIFFERENTIAL INVERSE MULTIPLEXING VIRTUAL CHANNELS IN 40G ETHERNET APPLICATIONS

(75) Inventors: Matthew Brown, Kinburn (CA); Dimitrios Giannakopoulos, Methuen, MA (US); Jim Lew, San Diego, CA (US); Michael John Hellmer, Carlsbad, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 109 days.

(21) Appl. No.: 12/250,475

(22) Filed: Oct. 13, 2008

(65) Prior Publication Data
US 2010/0092174 A1   Apr. 15, 2010

(51) Int. Cl.
*H04J 3/06* (2006.01)
(52) U.S. Cl. .................. 370/350; 370/401; 370/510
(58) Field of Classification Search .......... None
See application file for complete search history.

(56) References Cited

U.S. PATENT DOCUMENTS

| | | | |
|---|---|---|---|
| 4,855,999 A * | 8/1989 | Chao | 370/538 |
| 7,362,779 B1 * | 4/2008 | Zabezhinsky | 370/512 |
| 2003/0090763 A1 * | 5/2003 | Yang et al. | 359/130 |
| 2003/0179781 A1 * | 9/2003 | Kauschke et al. | 370/516 |
| 2007/0263533 A1 * | 11/2007 | Chiabrera | 370/229 |

* cited by examiner

*Primary Examiner*—Chirag G Shah
*Assistant Examiner*—Daniel Mitchell
(74) *Attorney, Agent, or Firm*—Law Office of Gerald Maliszewski; Gerald Maliszewski

(57) ABSTRACT

A system and method are provided for deinterleaving differential inverse multiplexed (DIM) virtual channels in a 40G Ethernet receiver. The method accepts a 10.3125 gigabits per second (Gbps) (10G) Ethernet virtual channel with 64B/86B blocks, including periodic Lane Alignment Marker (LAM) blocks. The 10G virtual channel is deinterleaved into two 5.15625 Gbps (5G) virtual channels by: 1) deinterleaving consecutive blocks from the 10G virtual channel into the 5G virtual channels in an alternating order, and 2) reversing the order of deinterleaving in response to each detected LAM block. Then, the method supplies the 5G virtual channels (i.e. to a MAC module).

24 Claims, 10 Drawing Sheets

DIFFERENTIAL INVERSE MULTIPLEXING VIRTUAL CHANNELS IN 40G ETHERNET APPLICATIONS

BACKGROUND OF THE INVENTION

1. Field of the Invention

This invention generally relates to digital communications and, more particularly, to a system and method for creating virtual subchannels, within a 10 gigabit per second (10G) virtual channel of a 40G Ethernet network.

2. Description of the Related Art

FIG. 1 is a schematic diagram of a wave division multiplexed (WDM) module interfacing between 40G fiber and a media access control (MAC) module (prior art). The 40G link may be in other forms including 4-lane backplane link, 4-lane copper link, or 4 separate (not WDM) optical links. In 40G applications, such as those based upon the emerging IEEE 802.3ba standard, 4 lanes or virtual channels of 10.3125 Gbps (10G) are supported. The interface between devices in this format is known at XLAUI. However, not all MAC modules are capable of supporting rates of 10.3125 Gbps. There is no means explicitly described in the 802.3ba standard to deinterleave a 10G virtual channel into two lanes and interleave at the other end. Even if the 10G channel could be deinterleaved, there is no disclosed means of compensating for potentially large skews resulting from buffering at the transmitter, differences in medium electrical length, and buffering at the receiver.

It would be advantageous if 10G virtual channels in a 40G Ethernet network could be simply deinterleaved into 5G subchannels, and reassembled into 10G channels on the receive side, without changing the specification or adding overhead to the signal.

SUMMARY OF THE INVENTION

Disclosed herein are a system and method that permit each of the four 10G (10.3125 Gbps) lanes in a 40G Ethernet signal, to be deinterleaved (disinterleaved) into two 5G (5.15625 Gbps) lanes in such a way that the lanes (virtual channels) may be re-interleaved, even in the event that a large amount of skew exists between the two lanes due the difference in latency between the deinterleaver and the interleaver. In deinterleaving the 10G virtual channel, the process determines the boundaries of the 66-bit blocks or words (i.e., 10GBASE-R 64B/66B format), if necessary. The data is sent one block at a time to each 5G lane in turn. An alignment marker exists, which is a special 64B/66B block already specified in 802.3ba for interleaving 10G virtual channels into a 40G signal. When an alignment marker is detected, the order of sending to each lane is reversed. This reversal process ensures that a marker will appear regularly in each lane. Without differentially swapping, the marker would only appear in one lane, since alignment markers are spaced by an even number of blocks.

At the far end, the reverse process is performed. First, the 66-bit block boundaries are determined, and then the alignment marker location is determined in each lane. Next, the skew offset between the lanes is determined and used, to offset the interleaver or to cause the lanes to be aligned in a variable delay buffer. Starting with the marker in one lane, the lanes are interleaved by sending a block for one lane, and then the other lane. When an alignment marker is detected, the order of interleaving is switched, thus re-assembling the signal in its original format.

Accordingly, a method is provided for deinterleaving differential inverse multiplexed (DIM) virtual channels in a 40G Ethernet receiver. The method accepts a 10.3125 gigabits per second (Gbps) (10G) Ethernet virtual channel with 64B/66B blocks, including periodic Lane Alignment Marker (LAM) blocks. The 10G virtual channel is deinterleaved into two 5.15625 Gbps (5G) virtual channels by: 1) deinterleaving consecutive blocks from the 10G virtual channel into the 5G virtual channels in an alternating order, and 2) reversing the order of deinterleaving in response to each detected LAM block. Then, the method supplies the 5G virtual channels (i.e. to a MAC module).

More explicitly, 1) deinterleaving consecutive blocks from the 10G virtual channel, into the 5G virtual channels in an alternating order includes: 1a) deinterleaving consecutive even blocks from the 10G virtual channel to a first 5G virtual channel, and 1b) deinterleaving consecutive odd blocks from the 10G virtual channel to a second 5G virtual channel. 2) reversing the order of deinterleaving in response to each, detected LAM block includes: 2a) deinterleaving consecutive odd blocks from the 10G virtual channel to the first 5G virtual channel, and 2b) deinterleaving consecutive even blocks from the 10G virtual channel to the second 5G virtual channel. If the accepted 10G virtual channel includes a LAM block embedded every $N^{th}$ block, then the order of deinterleaving the 5G virtual channels is reversed every $N^{th}$ block in the 10G virtual channel.

Also provided is a method for interleaving DIM virtual channels in a 40G Ethernet transmitter. The method accepts two 5G virtual channels with 64B/66B blocks including periodic LAM blocks, and interleaves the two 5G virtual channels into a 10G virtual channel. More explicitly, consecutive blocks from the two 5G virtual channels are interleaved into the 10G virtual channel in an alternating order. Then, in response to detecting each LAM block, the order of interleaving is reversed. The method transmits the 10G virtual channel.

Additional details of the above-described methods, as well as systems for transmitting and receiving differential inverse multiplexed 40G Ethernet virtual channels are provided below.

DETAILED DESCRIPTION

Figure 1:
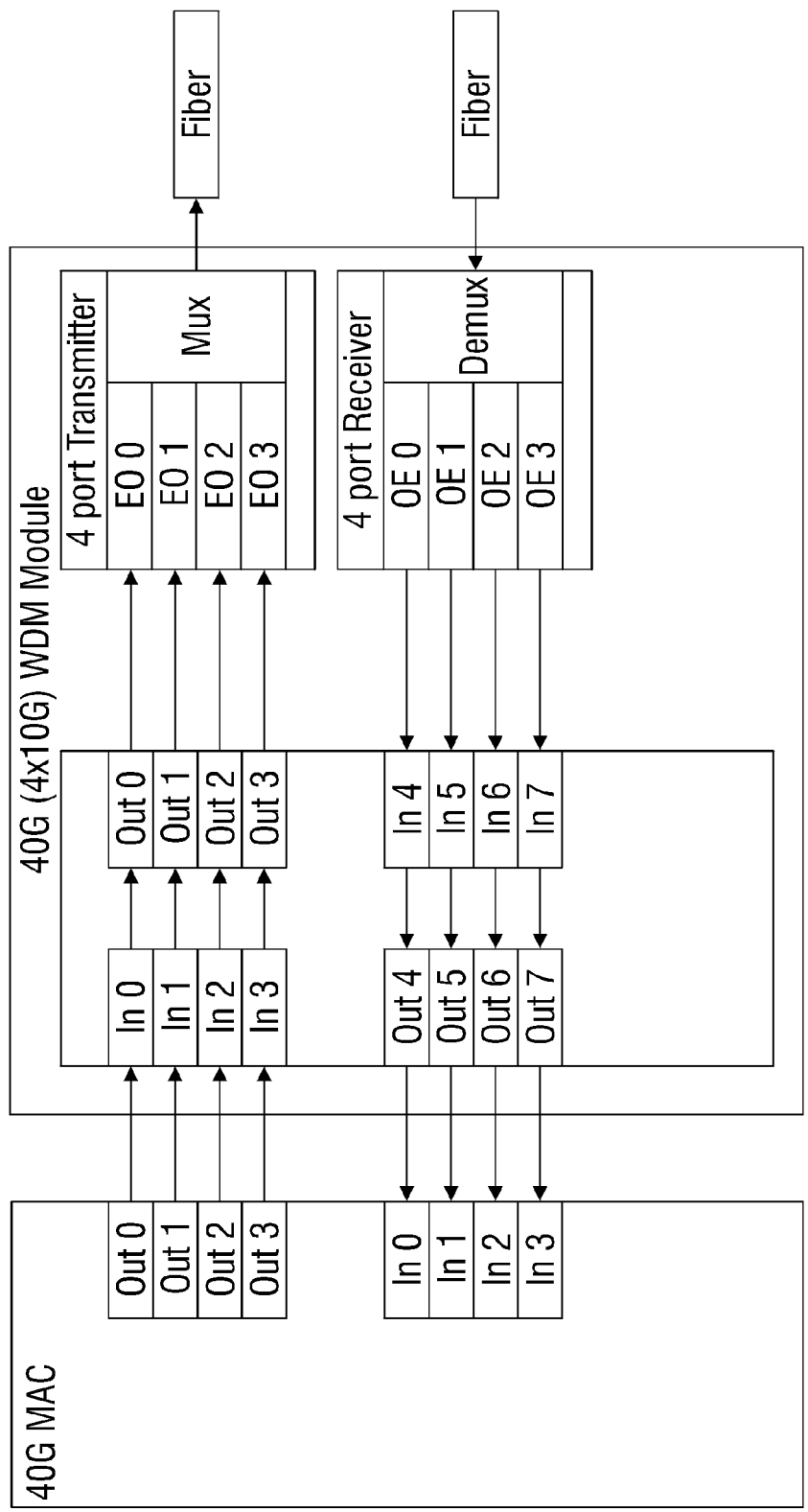
FIG. 1 is a schematic diagram of a wave division multiplexed (WDM) module interfacing between 40G fiber and a media access control (MAC) module (prior art).
Figure 2:
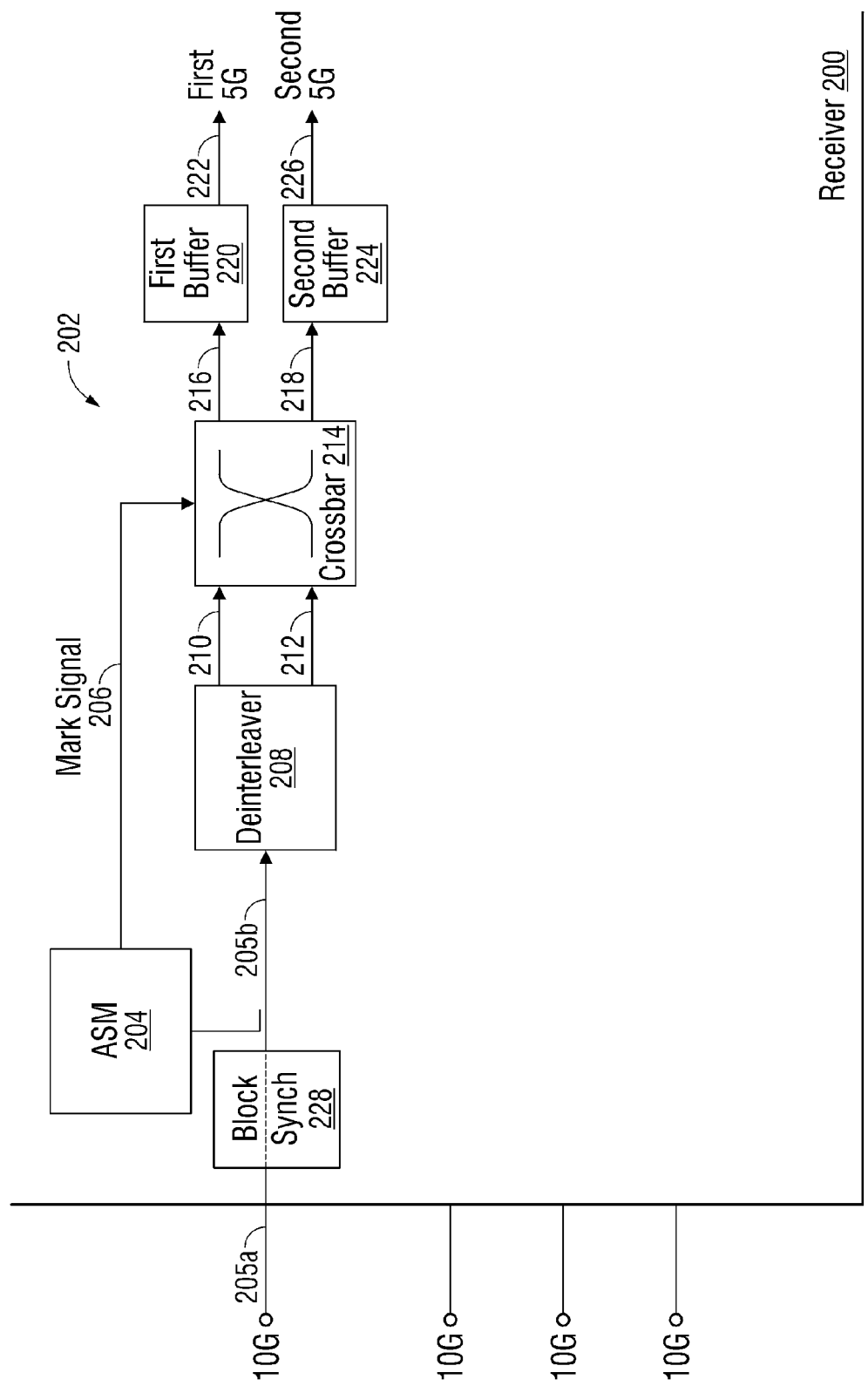
FIG. 2 is a system for deinterleaving differential inverse multiplexed (DIM) virtual channels in a 40G Ethernet receiver.

FIG. 2 is a system for deinterleaving differential inverse multiplexed (DIM) virtual channels in a 40G Ethernet receiver 200. The system 202 comprises an alignment synchronization module (ASM) 204 having an input on line 205 to detect a 10.3125 gigabits per second (Gbps) (10G) Ethernet virtual channel with 64B/66B blocks, and an output on line 206 to supply a Mark signal in response to detecting periodic Lane Alignment Marker (LAM) blocks in the 10G virtual channel. A deinterleaver 208 has an input on line 205 to accept the 10G virtual channel. The deinterleaver 208 deinterleaves consecutive blocks from the 10G virtual channel into first output on line 210 and a second output on line 212 in an alternating order.

A crossbar 214 has signal inputs connected to the deinterleaver outputs on lines 210 and 212, an input on line 206 to accept the Mark signal, and outputs 216 and 218, which are alternately connected to the signal inputs on lines 210 and 212 in response to each Mark signal received on line 206. A first buffer memory 220 has an input connected to the crossbar first output on line 216, and an output on line 222 to supply a first 5.15825 Gbps (5G) virtual channel. A second buffer memory 224 has an input connected to the crossbar second output, on line 218, and an output on line 226 to supply a second 5G virtual channel.

Care must be taken so that the crossbar reversal does not occur before sending the last block before the marker. This can be achieved in a number of ways. One way is to make sure that interleaver is synchronized with LAM, so that LAM always goes in first buffer 220. Alternately, the half rate clock to the buffers can be aligned with the LAM, delayed by one full rate clock cycle.

Figure 3:
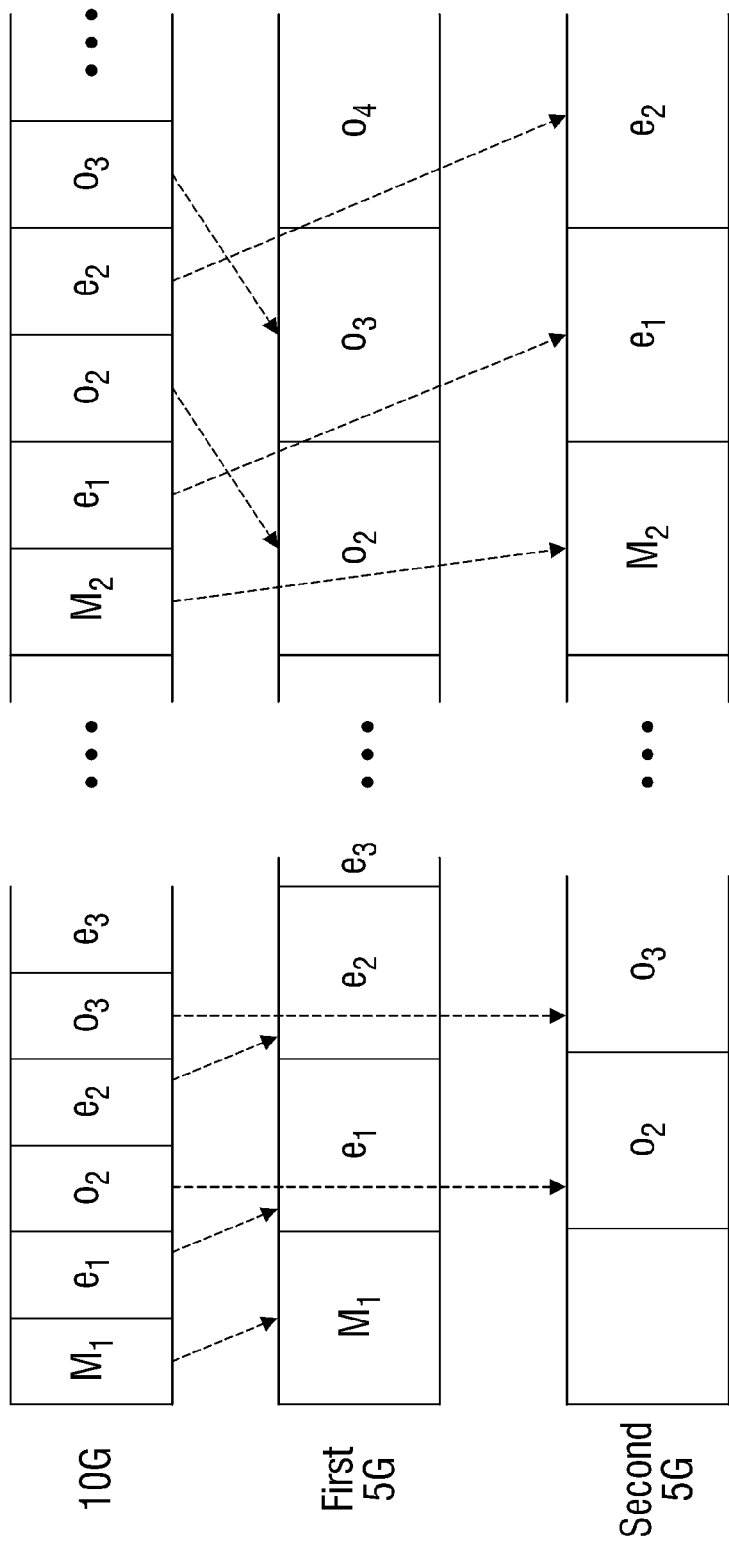
FIG. 3 is a diagram depicting the deinterleaving process for the system of FIG. 2.

FIG. 3 is a diagram depicting the deinterleaving process for the system of FIG. 2. The crossbar, following the receipt of a Mark signal, supplies consecutive even blocks (e) from the 10G virtual channel to the first buffer memory (i.e. the first 5G virtual channel) and consecutive odd blocks (o) from the 10G virtual, channel to the second buffer (i.e. the second 5G virtual channel). Note: the LAM block (M) is defined herein as the first odd block ($o_0$), in the context of the 10G channel. Following the receipt of a next Mark signal, the crossbar supplies consecutive even blocks from the 10G virtual channel to the second, buffer memory and consecutive odd blocks from the 10G virtual channel to the first buffer. If the ASM detects a LAM block embedded every $N^{th}$ block in the 10G virtual channel, then the crossbar reverses connections between the signal inputs and outputs every $N^{th}$ block in the 10G virtual channel. In other words, the crossbar switches every $N^{th}$ block. In one aspect, N=16,384.

Returning to FIG. 2, in one aspect, the deinterleaver 208 accepts a 10G virtual channel in an IEEE 802.3ba protocol. As shown, the receiver 200 may be enabled to accept a total of four 10G virtual channels in some aspects of the system 202. Note: not all the 10G channels need be deinterleaved into 5G virtual channels.

In one aspect, the system 202 includes a block synchronizer 228 that synchronizes blocks (e.g., 66B blocks) and aligns them in preparation for the align synchronization, alignment, and deinterleaving processes. This step is not required if the system end point, connected to lines 222 and 226, is a MAC device (not shown). In a MAC device an inverse multiplexing process is co-resident with system 202.

Thus, the block synch, align sync, and alignment process in the MAC device may not be required as these signals will already exist.

The clocking to the first and second buffers 220/224 is designed so that the crossbar reversal does not affect the block immediately previous to the LAM. Otherwise, the LAM block becomes unmatched in the series as follows: /D(i-1, N-1)/M(i)(/D(i-1, N)/D(I,2)/etc. In one aspect, the deinterleaver is synchronized with the Mark signal so that M always goes to line 212 and the buffers get clocked after M(i)=D(I,1) and D(i,2) are in the buffers.

Figure 4:
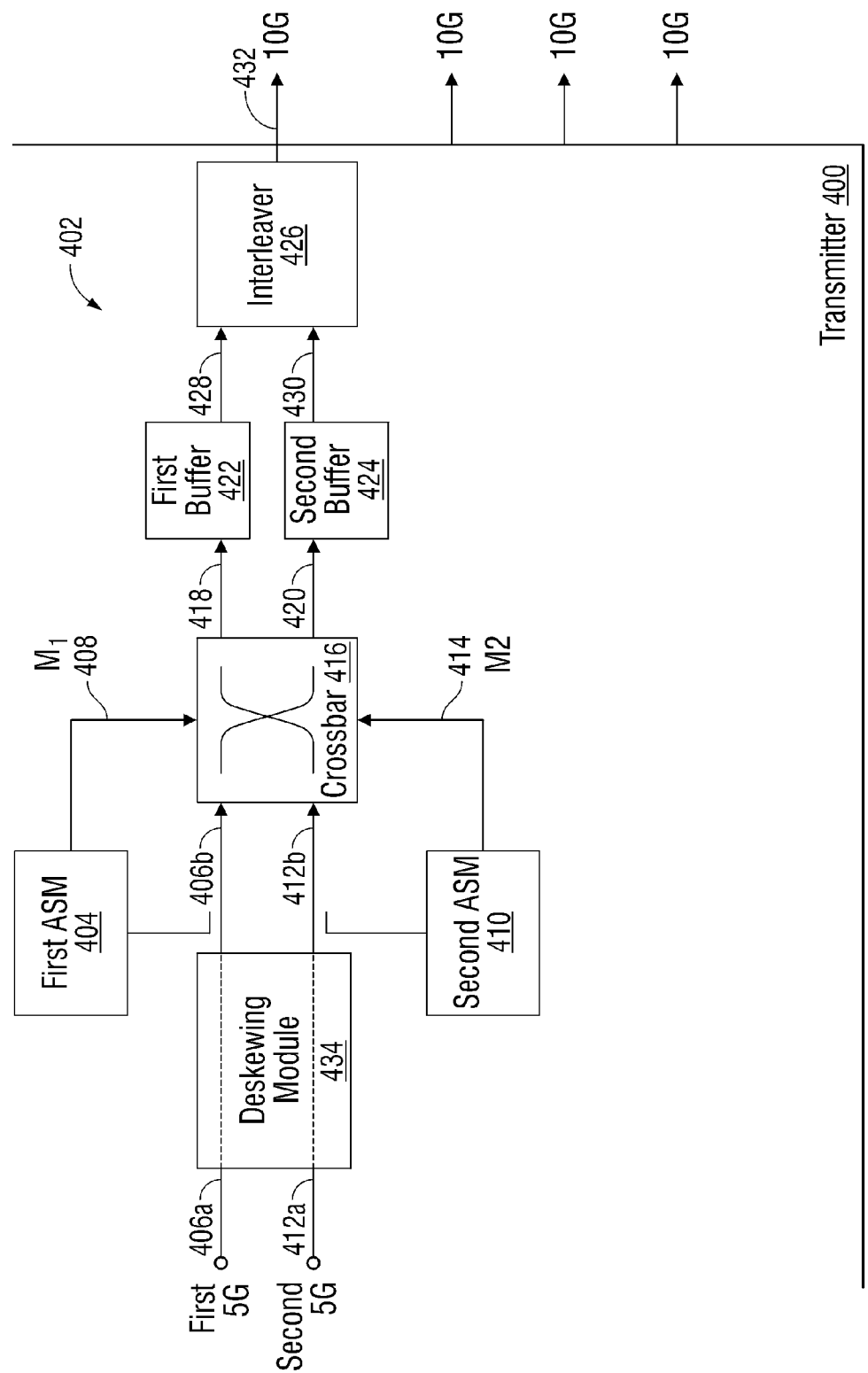
FIG. 4 is a schematic block diagram of system for interleaving DIM virtual channels in a 40G Ethernet transmitter.

FIG. 4 is a schematic block diagram of system for deinterleaving DIM virtual channels in a 40G Ethernet transmitter 400. The system 402 comprises a first ASM 404 having an input on line 406 to detect a first 5G virtual channel with 64B/66B blocks, and an output, on line 408 to supply first Mark signals (M1) in response to detecting periodic Lane Alignment Marker (LAM) blocks. A second ASM 410 has an input, on line 412 to detect a second 5G virtual channel with 64B/66B blocks and LAM blocks, and an output on line 414 to supply second Mark signals (M2) in response to detecting periodic LAM blocks.

A crossbar 416 has signal inputs on lines 408 and 412 to accept the first and second 5G virtual channels, respectively, and inputs on lines 408 and 414 to accept the first and second Mark signals, respectively. The crossbar 418 has outputs on lines 418 and 420, which are alternately connected to the signal inputs on lines 408 and 412, in response to each Mark signal received on lines 408 and 414. A first buffer 422 has an interface connected to the crossbar first output on line 418. A second buffer 424 has an interface connected to the crossbar second output 420. An interleaver 428 has inputs connected to the first and second buffers outputs on lines 428 and 430, respectively. The interleaver 428 interleaves consecutively received blocks in an alternating order, which are supplied at an output on line 432 as a 10G virtual channel. In one aspect, the interleaver 428 transmits a 10G virtual channel in an IEEE 802.3ba protocol for the transmission of four 10G virtual channels. As shown, the transmitter 400 is capable of transmitting a total of four 10G virtual channels in one aspect of the system.

Figure 5:
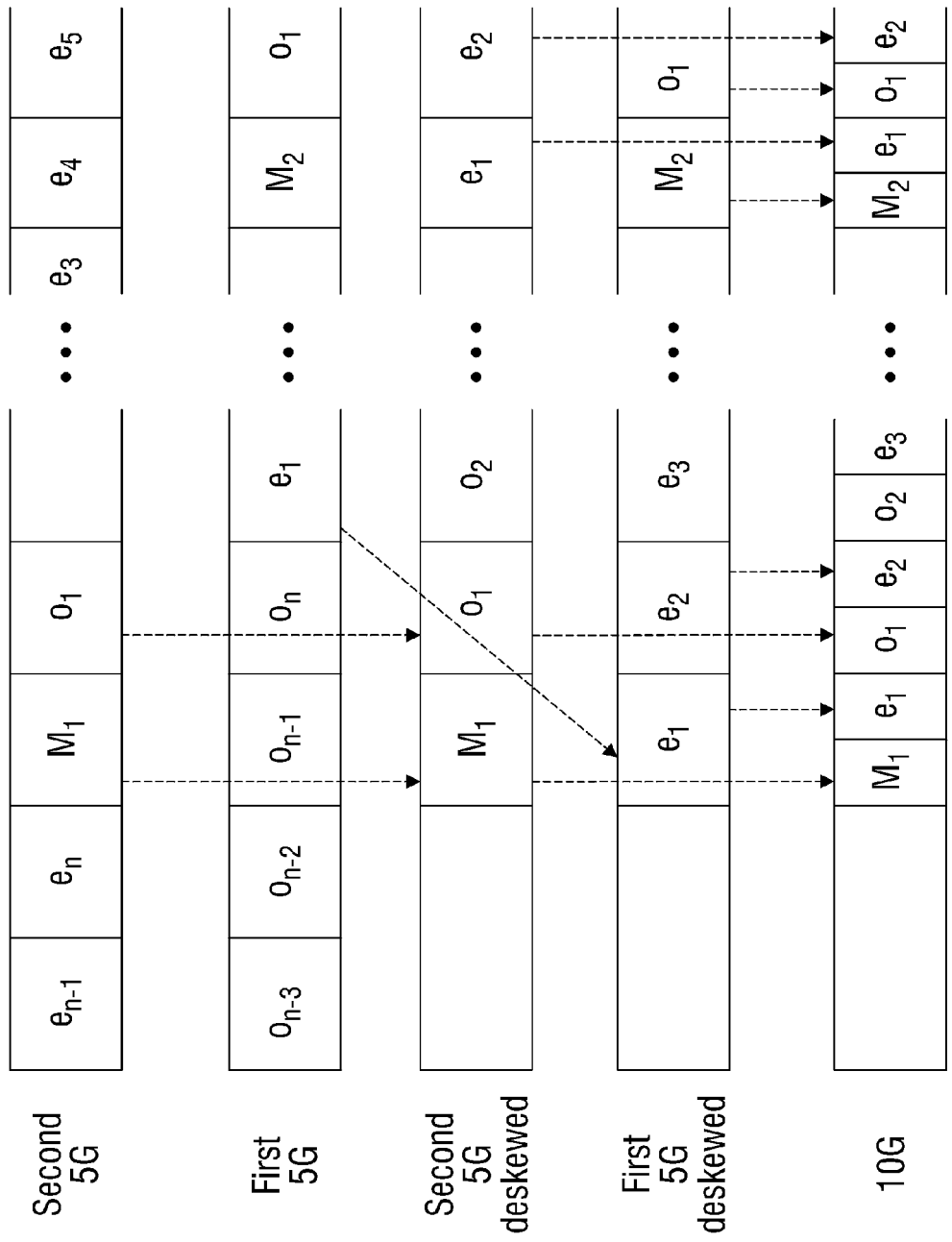
FIG. 5 is a diagram depicting the interleaving process in the system of FIG. 4.

FIG. 5 is a diagram depicting the interleaving process in the system of FIG. 4. Following the receipt of a first Mark signal (M1), the crossbar supplies consecutive blocks from the first 5G virtual channel to a first output and consecutive blocks from the second 5G virtual channel to a second output. Following the receipt of a second Mark signal (M2), the crossbar supplies consecutive blocks from the first 5G virtual channel to the second output, and consecutive blocks from the second 5G virtual channel to the first output. From this crossbar reversal, it can be seen that the interleaver forms the 10G virtual channel with consecutive even-order blocks (e) interleaved from the first 5G virtual channel and consecutive odd-order blocks (o) interleaved, from the second 5G virtual channel in response to a first Mark signal (M1) received, by the crossbar. The 10G virtual channel is formed with, consecutive odd-order blocks interleaved from the first 5G virtual channel and consecutive even-order blocks interleaved from the second 5G virtual channel in response to a second Mark signal (M2) received by the crossbar.

If the first ASM detects a LAM block embedded every $N^{th}$ block in the first 5B virtual channel, and the second ASM detects a LAM block every $N^{th}$ block in the second 5G virtual channel, offset from the LAM block in the first 5G virtual channel by M blocks, where M=N/2, then the crossbar reverses connections between the signal inputs and output every $M^{th}$ block in the 5G channels. In some aspects, N=16,384.

Returning to FIG. 4, in another aspect the system 402 further comprises a deskewing module 434 having inputs to accept the first and second 5B virtual channels on lines 406a and 412a, respectively, and outputs on lines 406b and 412b to supply the two 5G virtual channels to the first and second ASMs, respectively, with temporal offsets between the two 5G virtual channels removed. In one aspect, the deskewing module 434 detects a LAM block in each 5G virtual channel, and creates an offset of M blocks between a first LAM block in a first 5G virtual channel and a second LAM block in a second 5G virtual channel. In one aspect, the deskewing module performs the additional task of aligning the blocks. That is, the deskewing module detects the block boundaries as a first step in alignment.

Figure 8:
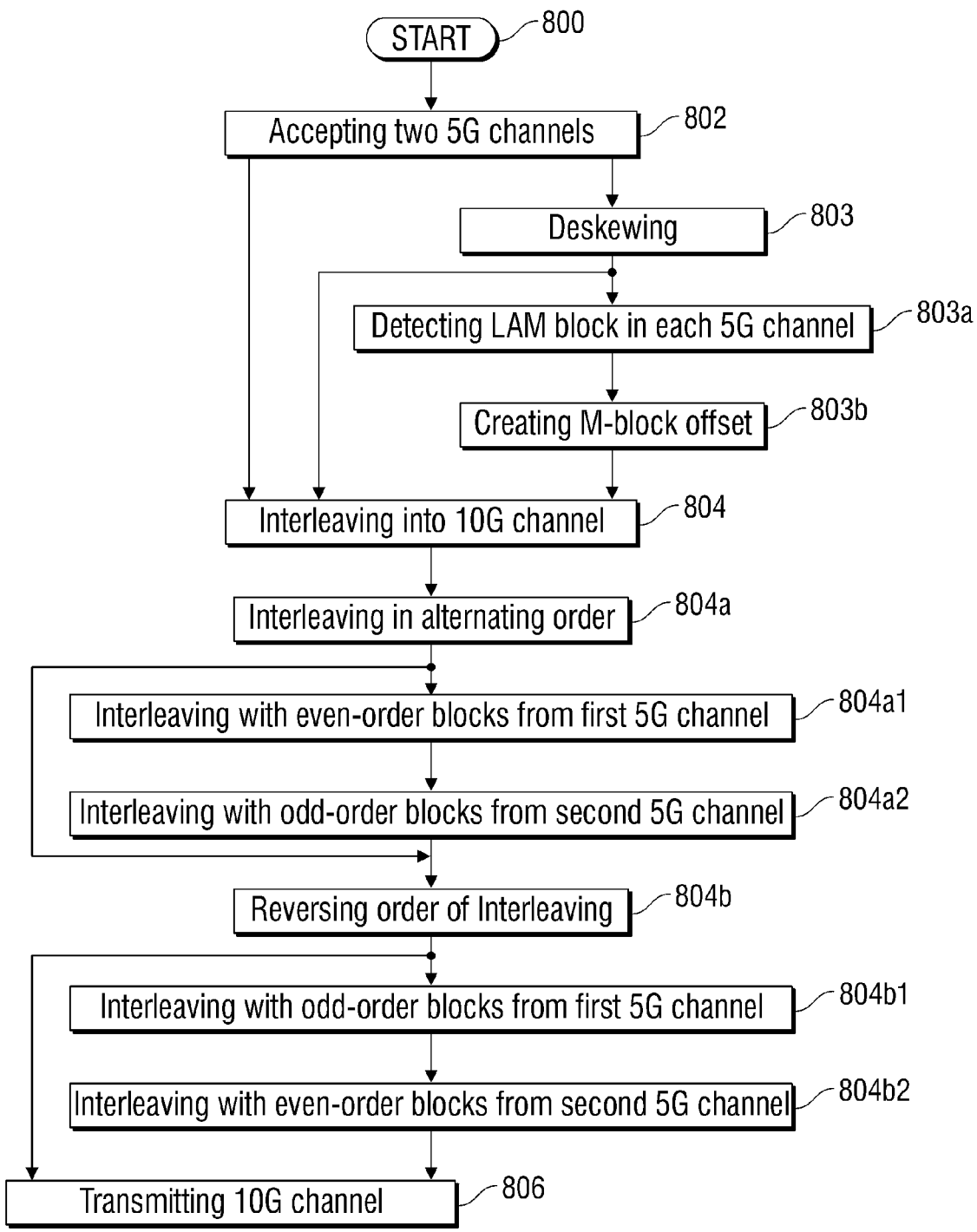
FIG. 8 is a flowchart illustrating a method for interleaving DIM virtual channels in a 40G Ethernet transmitter.

FIG. 8 is a schematic block diagram depicting a transceiver, with transmitter and receiver functions, enabled with the deinterleaving and interleaving systems described in the explanations of FIGS. 2 and 4.

Functional Description

IEEE 802.3ba provides for the transmission of 4 lanes at 10G, but not 8 lanes at 5G. The standard inserts unique lane alignment marker in each 10G lane. The marker not only provides a reference point to align the lanes, but also provides information to indicate which lane the signal is to assist in ordering the interleaved words properly. At the end point, the 4 lanes may be re-assembled into a 40G stream by first aligning the markers, and then interleaving in order.

As described above, the transmitter state machine on startup searches for the next LAM (Lane Alignment Marker) in a serial 10G stream or parallel bus. Once the transmitter finds the LAM, it starts deinterleaving the stream 66-bit blockwise. For example, the LAM 66-bit block is fed to physical lane_1 (first 5G), the next (in time) 66-bit block is fed to physical lane_2 (second 5G), the next (in time) 66-bit block is fed to physical lane__5G_1, and so on. When the next LAM block is detected, the transmitter switches this LAM block to physical lane_2, the next to physical lane_1, and so on. The process alternates again in the next LAM block, and so on.

The receiver monitors both physical 5G lanes, and when it detects a LAM block in either one, it starts putting together the 10G stream starting from the LAM block, then interleaving the blocks from the other physical 5G lane, and so on. In some aspects, physical lane_1 and physical lane_2 must first be aligned first at the receiver, in the sense that the detected LAM position in physical lane_1 vs. the detected LAM position in physical lane_2 are the proper distance apart (e.g., 16,384 divided by 2 blocks). If this is achieved, then the receiver can auto-align even in the case where the sync is lost and then recovered.

Advantageously, with the alternating LAM concept, it is not necessary to have physical coding sublayer (PCS) encoded data in between LAMs, making the concept agnostic to the format, as long as the distance between 2 consecutive LAMs (as far as the 10G stream is concerned) is N*66 bits (where N is an integer). More generally, if the signals are not PCS encoded, then the blocks need not be 66 bits. Thus, LAM can he any size P, and spaced by N blocks of size P.

Figure 6:
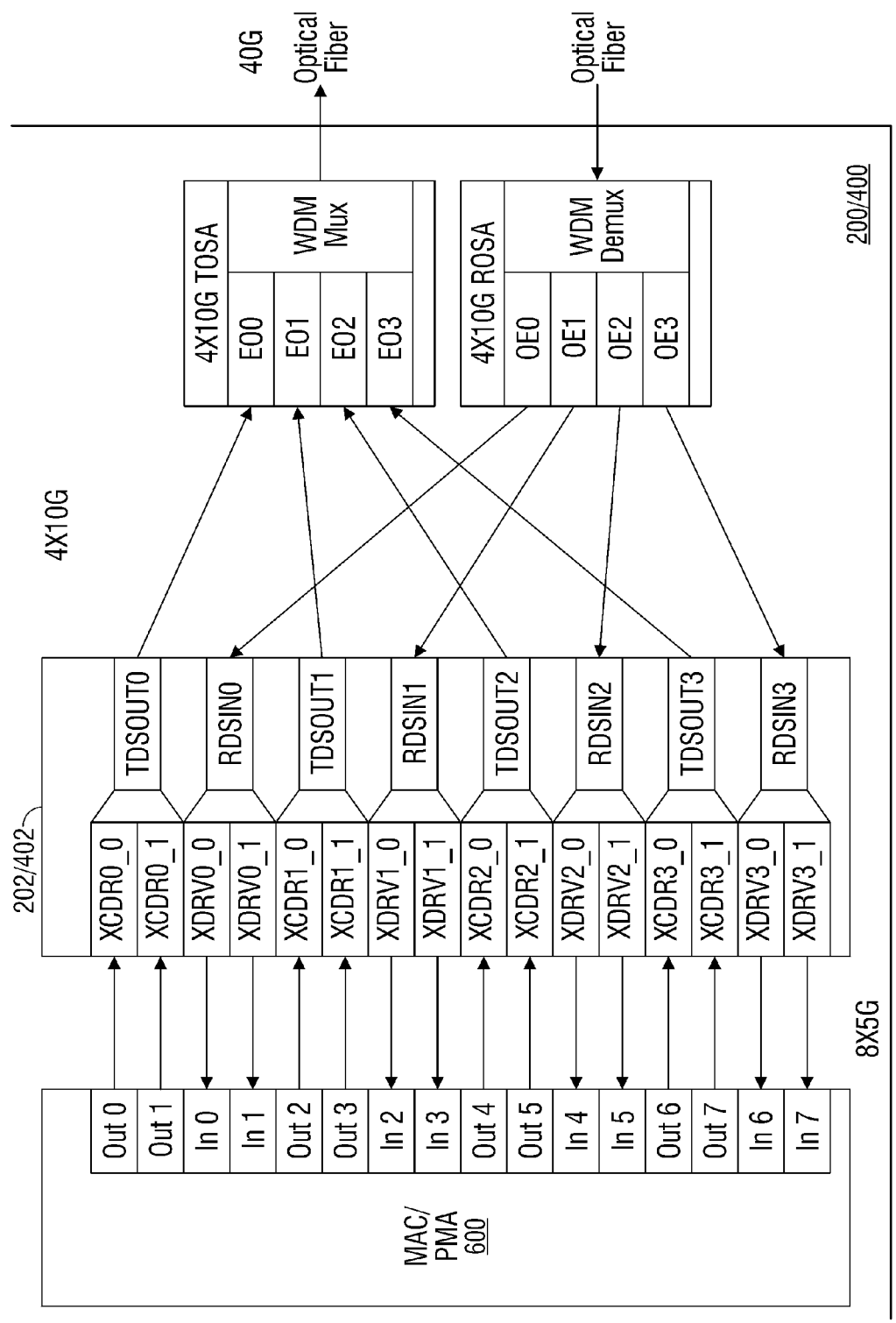
FIG. 6 is a schematic block diagram depicting a transceiver, with transmitter and receiver functions, enabled with the deinterleaving and interleaving systems described in the explanations of FIGS. 2 and 4.

Scenario 1: Starting at MAC Device and Sending to Separate PHY Device Via 8 Lanes of 5G, see FIG. 6.

MAC device 600—The MAC device generates unformatted words and the PMA converts to 64B/66B blocks deinterleaved into four 10G virtual lanes and inserts the LAMs. Further, the four 10G lanes are deinterleaved into eight 5G lanes. Device 202/402 recovers data on 8 lanes, determines block sync on each lane, determines align sync on each lane, aligns each pair of lanes, and interleaves each pair of lanes to form four 10G virtual lanes.

Scenario 2: Receiving at PHY Input and Sending to MAC Device Via 8 Lanes of 5G.

PHY device 202/402 PHY recovers 4 lanes of 10G, determines block sync on each lane, determines align sync on each lane, deinterleaves into eight 5G lanes per description above, and drives the 8 lanes. Although not shown, device 600 recovers data on 8 lanes, determines block sync on each lane, determines align sync on each lane, aligns each pair of lanes, and interleaves each pair of lanes to form four 10G virtual lanes. The four 10G lanes may be processed as single 40G channel.

Figure 7:
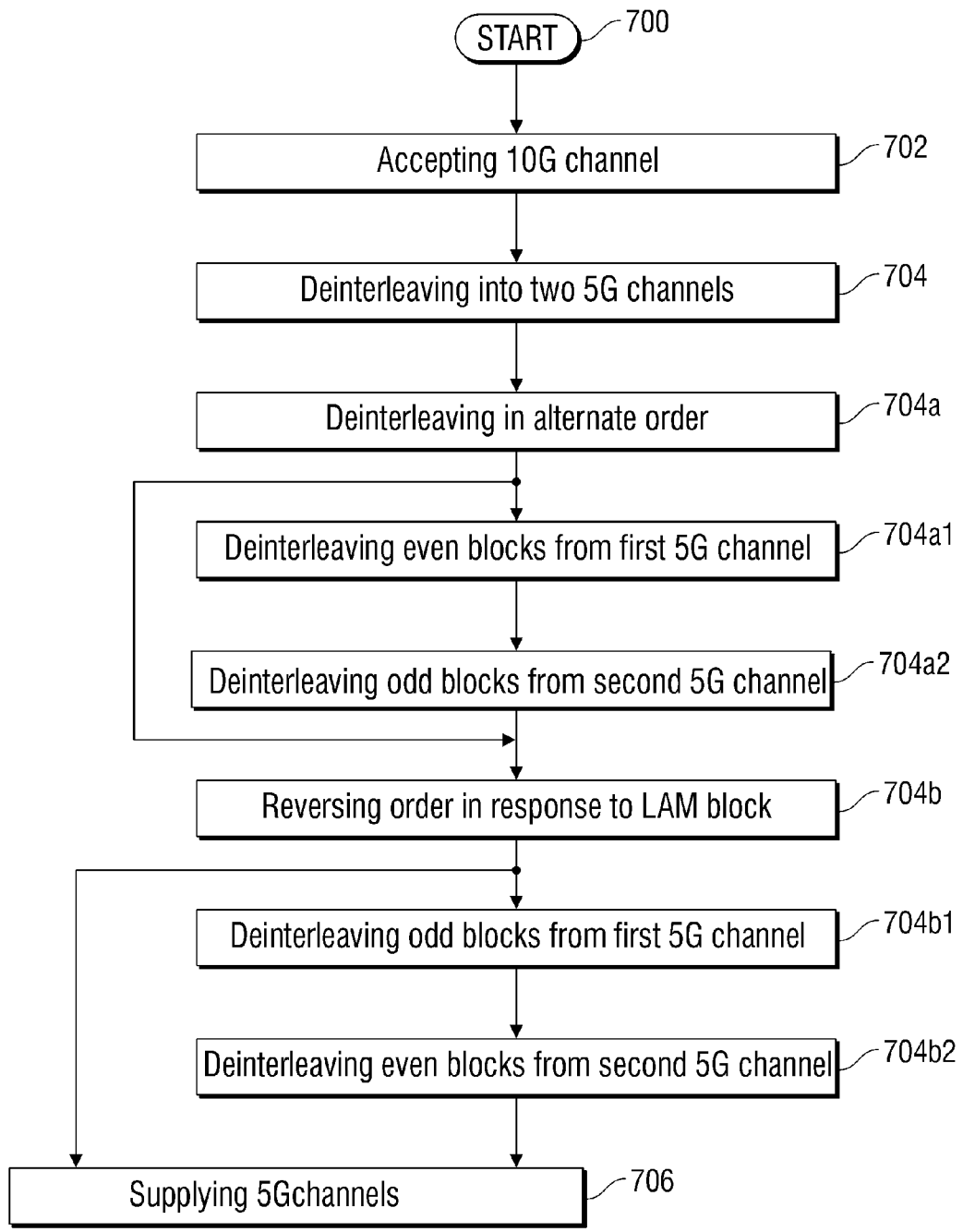
FIG. 7 is a flowchart illustrating a method for deinterleaving DIM virtual channels in a 40G Ethernet receiver.

FIG. 7 is a flowchart illustrating a method for deinterleaving DIM virtual channels in a 40G Ethernet receiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Step 702 accepts a 10G virtual channel with 64B/66B blocks, including periodic Lane Alignment Marker (LAM) blocks. For MAC/PCS devices, which create blocks and insert the alignment blocks, a process for detection, alignment, and synchronization may not be required. Step 704 deinterleaves the 10G virtual channel into two 5G virtual channels using the following substeps. Step 704a deinterleaves consecutive blocks from the 10G virtual channel into the 5G virtual channels in an alternating order. In response to each detected LAM block, Step 704b reverses the order of deinterleaving. Step 706 supplies the 5G virtual channels. In some aspects, the 5G virtual channels are buffered in a tangible memory medium prior to transmission.

In one aspect, deinterleaving consecutive blocks from the 10G virtual channel into the 5G virtual channels in an alternating order (Step 704a) includes substeps. Step 704a1 deinterleaves consecutive even blocks from the 10G virtual channel to a first 5G virtual channel. Step 704a2 deinterleaves consecutive odd blocks from the 10G virtual channel to a second 5G virtual channel. Likewise, reversing the order of deinterleaving in response to each detected LAM block (Step 704b) may include additional substeps. Step 704b1 deinterleaves consecutive odd blocks from the 10G virtual channel to the first 5G virtual channel. Step 704b2 deinterleaves consecutive even blocks from the 10G virtual channel to the second 5G virtual channel.

In one aspect, accepting the 10G virtual channel with periodic LAM blocks in Step 702 includes accepting the 10G virtual channel with a LAM block embedded every $N^{th}$ block. Then, reversing the order of deinterleaving in response to a LAM block (Step 704b) includes reversing the order of deinterleaving the 5G virtual channels, every $N^{th}$ block in the 10G virtual channel. For example, N may be equal to 16,384. In another aspect, accepting the 10G virtual channel in Step 702 includes accepting four 10G virtual channels in an IEEE 802.3ba protocol.

FIG. 8 is a flowchart illustrating a method for interleaving DIM virtual channels in a 40G Ethernet transmitter. The method starts at Step 800. Step 802 accepts two 5G virtual channels with 64B/66B blocks including periodic LAM blocks. Step 804 interleaves the two 5G virtual channels into a 10G virtual channel with the following substeps. Step 804*a* interleaves consecutive blocks from the two 5G virtual channels into the 10G virtual channel in an alternating order. Step 804*b*, in response to detecting each LAM block, reverses the order of interleaving. Step 806 transmits the 10G virtual channel. In the case of a MAC/PCS device, Step 806 supplies the 10G channel to a termination point. In some aspects, the 5G streams are buffered (separately) in a tangible memory medium, prior to interleaving.

In one aspect, interleaving consecutive blocks from the two 5G virtual channels to the 10G virtual channel in an alternating order (Step 804*a*) includes substeps. Step 804*a*1 forms the 10G virtual channel with consecutive even-order blocks interleaved from a first 5G virtual channel. Step 804*a*2 forms the 10G virtual channel with consecutive odd-order blocks interleaved from a second 5G virtual channel. Likewise, reversing the order of interleaving in response to detecting each LAM block (Step 804*b*) may include additional substeps. Step 804*b*1 forms the 10G virtual channel with consecutive odd-order blocks interleaved from the first 5G virtual channel. Step 804*b*2 forms the 10G virtual, channel with consecutive even-order blocks interleaved from the second 5G virtual channel.

In one aspect, accepting two 5G virtual channels with LAM words (Step 802) includes each 5G virtual channel having a LAM block embedded every $N^{th}$ block, offset from the other 5G virtual channel by M blocks, where M=N/2. Then, reversing the order of interleaving in response to each detected LAM block (Step 804*b*) includes reversing the order of interleaving to the 10G virtual channel, every $M^{th}$ block in the 5G channels. For example, N may be equal to 16,384.

In another aspect, prior to interleaving the two 5G virtual channels, Step 803 deskews temporal offset between the two 5G virtual channels. For example, Step 803 may include the following substeps. Step 803*a* detects a LAM block in each 5G virtual channel. Step 803*b* creates an offset of M blocks between a first LAM block in a first 5G virtual channel and a second LAM block in a second 5G virtual channel.

In another aspect, accepting the two 5G virtual channels in Step 802 includes accepting a plurality of virtual channels, and transmitting the 10G virtual channel in Step 806 includes transmitting four 10G virtual channels in an IEEE 802.3ba protocol.

Figure 9:
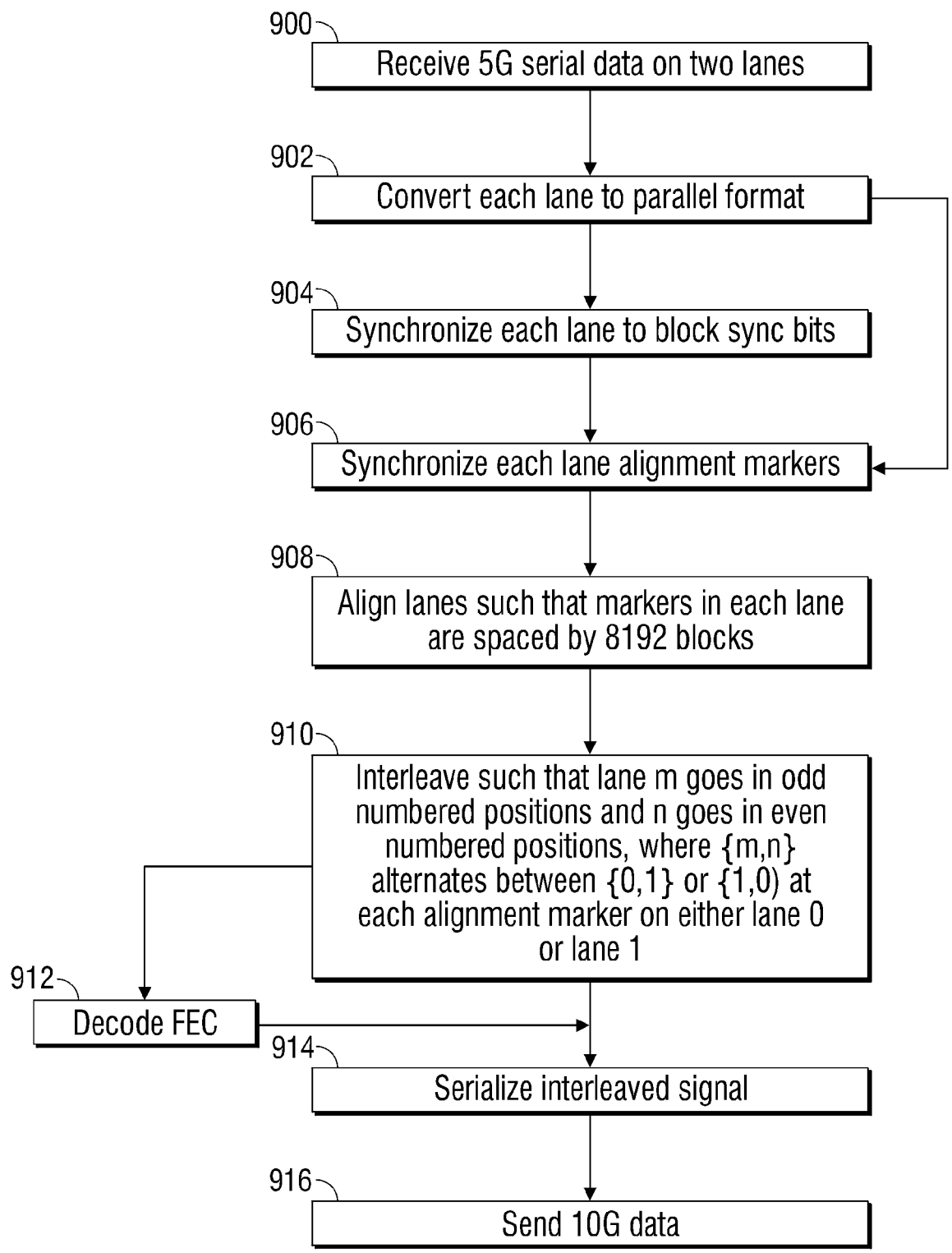
FIG. 9 is a flowchart illustrating a method for the transmission of 5G virtual channels in a 40G Ethernet network, showing additional features not depicted in FIG. 7.

FIG. 9 is a flowchart illustrating a method for the transmission of 5G virtual channels in a 40G Ethernet network, showing additional features not depicted in FIG. 7. In Step 900 two 5G virtual channels are accepted. In Step 902 each lane is converted to a parallel format, and in Step 904 the lanes (virtual channels) are synchronized to 64B/66B blocks. In Step 906 the alignment markers are synchronized. Step 908 aligns the two 5G channels, removing any temporal offset, in Step 910 the two channels are interleaved, as described above. In Step 914, the 10G channel is serialized. Optionally, in Step 912 the 10G channel is encoded, for forward-error correction (FEC) prior to serialization. In Step 916 the 10G channel is transmitted.

Figure 10:
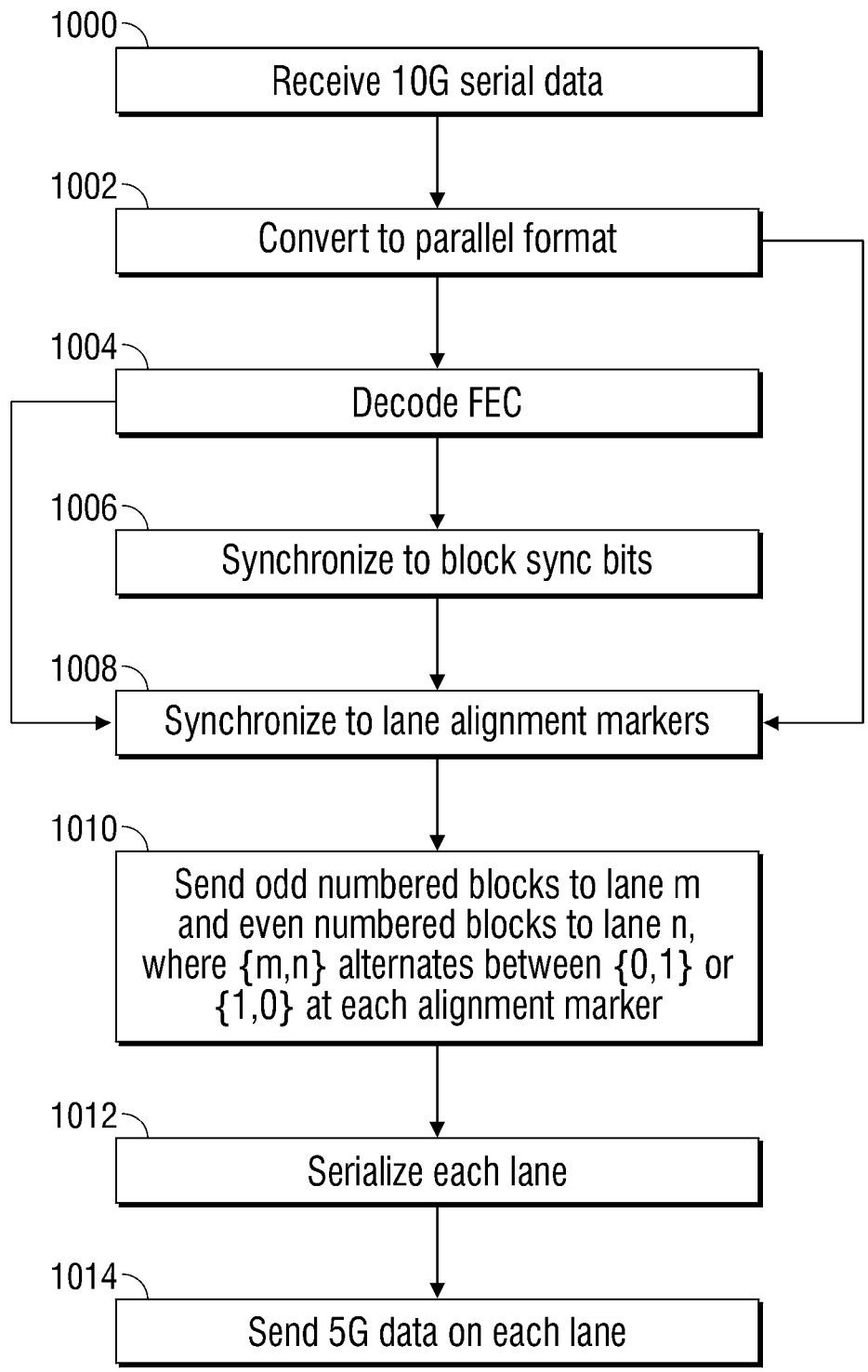
FIG. 10 is a flowchart illustrating a method for the receipt of 5G virtual channels in a 40G Ethernet network, showing additional features not depicted in FIG. 8.

FIG. 10 is a flowchart illustrating a method for the receipt of 5G virtual channels in a 40G Ethernet network, showing additional features not depicted in FIG. 8. In Step 1000, a 10G channel is received, and converted into a parallel format in Step 1002. Optionally, the channel is FEC decoded in Step 1004. In Step 1006 the blocks are synched, and in Step 1008 the LAM blocks are synched. In Step 1010, the 10G channel is deinterleavered, as described above. In Step 1012 the 5G channels are serialized, and in Step 1014 the 5G channels are supplied.

Systems and methods have been provided for differential inverse multiplexing virtual channels in a 40G Ethernet transceiver. Specific circuit blocks and timing relationships have been used as examples to illustrate the invention. However, the Invention is not limited to merely these examples. While the invention has been presented in the context of the IEEE 802.3ba standard, the invention has broader application. The above-described systems and methods are equally applicable to deinterleaving 5G lanes in 100G applications, into 2.5G lanes, and likewise, interleaving 2.5G lanes into 5G lanes. Other variations and embodiments of the invention will occur to those skilled in the art.

We claim:

1. A method for interleaving differential inverse multiplexed (DIM) virtual channels in a 40G Ethernet receiver, the method comprising:
   accepting a 10.3125 gigabits per second (Gbps) (10G) virtual channel with 64B/66B blocks, including periodic Lane Alignment Marker (LAM) blocks;
   differentially inverse multiplexing the 10G virtual channel into two 5.15625 Gbps (5G) virtual channels as follows:
      embedding a first LAM block into a first 5G virtual channel;
      beginning with the first 5G virtual channel, deinterleaving consecutive blocks from the 10G virtual channel into the 5G virtual channels in an alternating order;
      in response to each detected LAM block, reversing the order of differential inverse multiplexing; and,
   supplying the 5G virtual channels.

2. The method of claim 1 wherein deinterleaving consecutive blocks from the 10G virtual channel into the 5G virtual channels in an alternating order includes:
   deinterleaving consecutive even blocks from the 10G virtual channel to the first 5G virtual channel, where the next block following each LAM block in the 10G channel is defined as an even block; and,
   deinterleaving consecutive odd blocks from the 10G virtual channel to a second 5G virtual channel;
   wherein reversing the order of differential inverse multiplexing in response to each detected LAM block includes:
      embedding a second LAM block into the second 5G virtual channel;
      beginning with the second 5G virtual channel, deinterleaving consecutive even-order blocks from the 10G virtual channel to the second 5G virtual channel; and,
      deinterleaving consecutive odd-order blocks from the 10G virtual channel to the first 5G virtual channel.

3. The method of claim 1 wherein accepting the 10G virtual channel with periodic LAM blocks includes accepting the 10G virtual channel having a LAM block embedded every $N^{th}$ block; and
   wherein reversing the order of differential inverse multiplexing in response to a LAM block includes reversing the order of differential inverse multiplexing the 5G virtual channels, every $N^{th}$ block in the 10G virtual channel.

4. The method of claim 3 wherein accepting the 10G virtual channel having the LAM block embedded every $N^{th}$ block includes N being equal to 16,384.

5. The method of claim 1 wherein accepting the 10G virtual channel includes accepting four 10G virtual channels in an IEEE 802.3ba protocol.

6. A method for deinterleaving differential inverse multiplexed (DIM) virtual channels in a 40G Ethernet transmitter, the method comprising:

accepting two 5.15625 gigabit per second (Gbps) (5G) virtual channels with 64B/66B blocks including periodic Lane Alignment Marker (LAM) blocks;

differentially inverse demultiplexing the two 5G virtual channels into a 10.3125 Gbps (10G) virtual channel as follows:

detecting a first LAM block in a first 5G virtual channel;

beginning with the first 5G virtual channel, interleaving consecutive blocks from the two 5G virtual channels into the 10G virtual channel in an alternating order;

in response to detecting each LAM block, reversing the order of differential inverse demultiplexing; and, transmitting the 10G virtual channel.

7. The method of claim 6 wherein interleaving consecutive blocks from the two 5G virtual channels to the 10G virtual channel in an alternating order includes:

forming the 10G virtual channel with consecutive even-order blocks interleaved from the first 5G virtual channel, defined as an even block;

forming the 10G virtual channel with consecutive odd-order blocks interleaved from a second 5G virtual channel;

wherein reversing the order of-differential inverse demultiplexing in response to detecting each LAM block includes:

detecting a second LAM block in the second 5G virtual channel;

beginning with the second 5G virtual channel, forming the 10G virtual channel with consecutive even-order blocks interleaved from the second 5G virtual channel; and, forming the 10G virtual channel with consecutive odd-order blocks interleaved from the first 5G virtual channel.

8. The method of claim 6 wherein accepting two 5G virtual channels with LAM words includes each 5G virtual channel having a LAM block embedded every $N^{th}$ block, offset from the other 5G virtual channel by M blocks, where M=N/2; and wherein reversing the order of differential inverse demultiplexing in response to each detected LAM block includes reversing the order of differential inverse demultiplexing to the 10G virtual channel, every $M^{th}$ block in the 5G channels.

9. The method of claim 8 further comprising prior to interleaving the two 5G virtual channels, deskewing temporal offset between the two 5G virtual channels.

10. The method of claim 9 wherein deskewing temporal offset between the two 5G virtual channels includes:

detecting a LAM block in each 5G virtual channel; and, creating an offset of M blocks between a first LAM block in a first 5G virtual channel and a second LAM block in a second 5G virtual channel.

11. The method of claim 8 wherein accepting each 5G virtual channel having a LAM block embedded every $N^{th}$ block includes N being equal to 16,384.

12. The method of claim 6 wherein accepting the two 5G virtual channels includes accepting a plurality of virtual channels; and, wherein transmitting the 10G virtual channel includes transmitting four 10G virtual channels in an IEEE 802.3ba protocol.

13. A system for interleaving differential inverse multiplexed (DIM) virtual channels in a 40G Ethernet receiver, the system comprising:

an alignment synchronization module (ASM) having an input to detect a 10.3125 gigabits per second (Gbps) (10G) Ethernet virtual channel with 64B/66B blocks, and an output to supply a Mark signal in response to detecting periodic Lane Alignment Marker (LAM) blocks in the 10G virtual channel;

a deinterleaver having an input to accept the 10G virtual channel, the deinterleaver deinterleaving consecutive blocks from the 10G virtual channel into first and second outputs in an alternating order;

a crossbar having signal inputs connected to the deinterleaver outputs, an input to accept the Mark signal, and outputs selectively connected to the signal inputs to supply a LAM block via one crossbar first output, followed by consecutive even-order blocks from the 10G virtual channel, to supply consecutive odd-order blocks from the 10G virtual channel via another crossbar output, and in response to each received Mark signal, alternating the output stream into which the next LAM block is embedded;

a first buffer memory having an input connected to the crossbar first output, and an output to supply a first 5.15625 Gbps (5G) virtual channel; and, a second buffer memory having an input connected to the crossbar second output, and an output to supply a second 5G virtual channel.

14. The system of claim 13 wherein the crossbar, following the receipt of a first Mark signal, supplies a first LAM block and consecutive even-order blocks from the 10G virtual channel to the first buffer memory and consecutive odd-order blocks from the 10G virtual channel to the second buffer, and following the receipt of a second Mark signal, the crossbar supplies the second LAM block and consecutive even-order blocks from the 10G virtual channel to the second buffer memory and consecutive odd-order blocks from the 10G virtual channel to the first buffer.

15. The system of claim 13 wherein the ASM detects a LAM block embedded every $N^{th}$ block in the 10G virtual channel; and, wherein the crossbar alternates the output into which the LAM block is placed every $N^{th}$ block in the 10G virtual channel.

16. The system of claim 15 wherein N=16,384.

17. The system of claim 13 wherein the deinterleaver accepts a 10G virtual channel in an IEEE 802.3ba protocol including four 10G virtual channels.

18. A system for deinterleaving differential inverse multiplexed (DIM) virtual channels in a 40G Ethernet transmitter, the system comprising:

a first alignment synchronization module (ASM) having an input to detect a first 5.15625 gigabit per second (Gbps) (5G) virtual channel with 64B/66B blocks, and an output to supply first Mark signals in response to detecting periodic Lane Alignment Marker (LAM) blocks;

a second ASM having an input to detect a second 5G virtual channel with 64B/66B blocks, and an output to supply second Mark signals in response to detecting periodic LAM blocks;

a crossbar having signal inputs to accept the first and second 5G virtual channels, and an input to accept the first and second Mark signals, the crossbar supplying consecutive blocks from the first 5G virtual channel via one output, and consecutive blocks from the second 5G virtual channel via another output in response to the first Mark signal, and alternating the outputs into which the 5G virtual channels are placed in response to the second Mark signal;

a first buffer having an interface connected to a crossbar first output;

a second buffer having an interface connected to a crossbar second output an interleaver having inputs connected to first and second buffer outputs, the interleaver interleaving consecutively received blocks in an alternating order, supplied at an output as a 10.3125 Gbps (10G) virtual channel.

19. The system of claim 18 wherein the crossbar, following the receipt of the first Mark signal, supplies consecutive blocks from the first 5G virtual channel to the first output and consecutive blocks from the second 5G virtual channel to the second output, and following the receipt of the second Mark signal, supplies consecutive blocks from the first 5G virtual channel to the second output and consecutive blocks from the second 5G virtual channel to the first output; and, wherein the interleaver forms the 10G virtual channel with consecutive even-order blocks interleaved from the first 5G virtual channel and consecutive odd-order blocks interleaved from the second 5G virtual channel in response to the first Mark signal received by the crossbar, and forms the 10G virtual channel with consecutive odd-order blocks interleaved from the first 5G virtual channel and consecutive even-order blocks interleaved from the second 5G virtual channel in response to the second Mark signal received by the crossbar.

20. The system of claim 18 wherein the first ASM detects a LAM block embedded every $N^{th}$ block in the first 5G virtual channel;

wherein the second ASM detects a LAM block every $N^{th}$ block in the second 5G virtual channel, offset from the LAM block in the first 5G virtual channel by M blocks, where M=N/2; and wherein the crossbar reverses connections between the signal inputs and output every $M^{th}$ block in the 5G channels.

21. The system of claim 20 further comprising a deskewing module having inputs to accept the first and second 5G virtual channels, and outputs to supply the two 5G virtual channels to the first and second ASMs, with temporal offsets between the two 5G virtual channels removed.

22. The system of claim 21 wherein deskewing module detects a LAM block in each 5G virtual channel, and creates an offset of M blocks between a first LAM block in a first 5G virtual channel and a second LAM block in a second 5G virtual channel.

23. The system of claim 20 wherein N=16,384.

24. The system of claim 18 wherein the interleaver transmits a 10G virtual channel in an IEEE 802.3ba protocol for the transmission of four 10G virtual channels.

* * * * *